June 4, 1968     D. S. BANKS     3,387,194
ELECTRIC MOTOR CONTROL SYSTEM INCLUDING A BANK OF
BATTERIES FOR SERIES/PARALLEL OPERATION
Filed Oct. 31, 1967     3 Sheets-Sheet 1

INVENTOR.
DONALD S. BANKS

BY     ATTORNEYS.

INVENTOR.
DONALD S. BANKS

BY

ATTORNEYS.

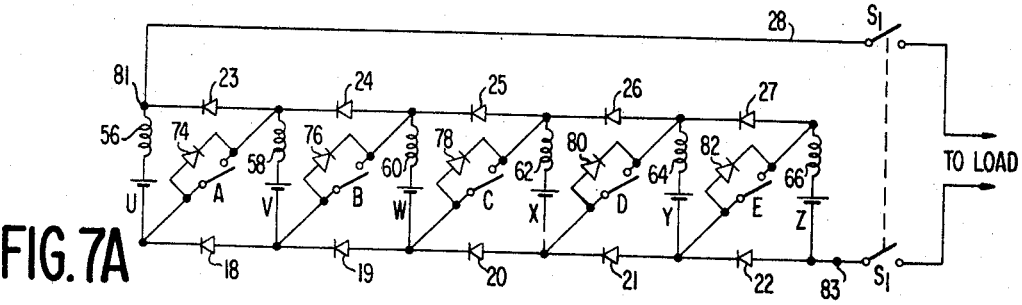
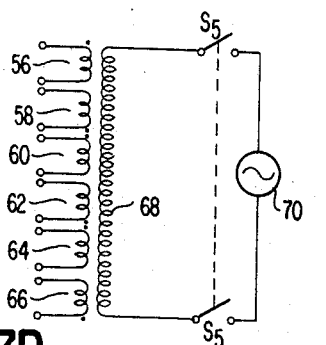
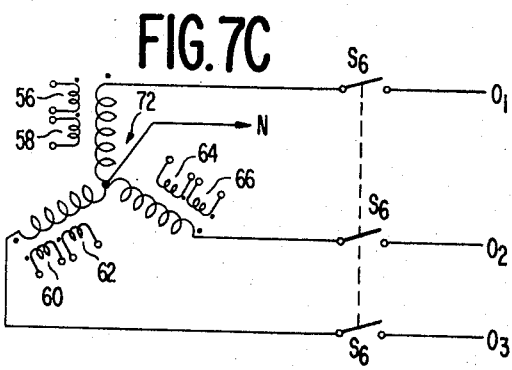
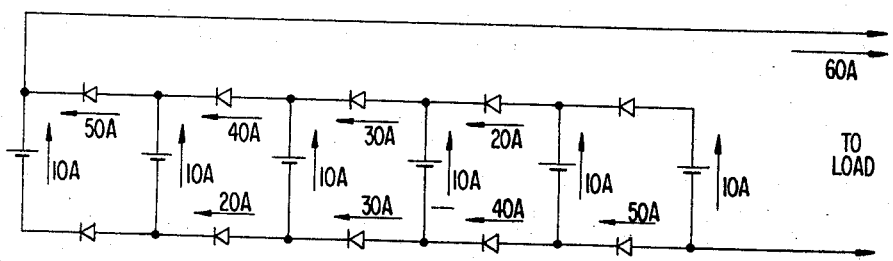
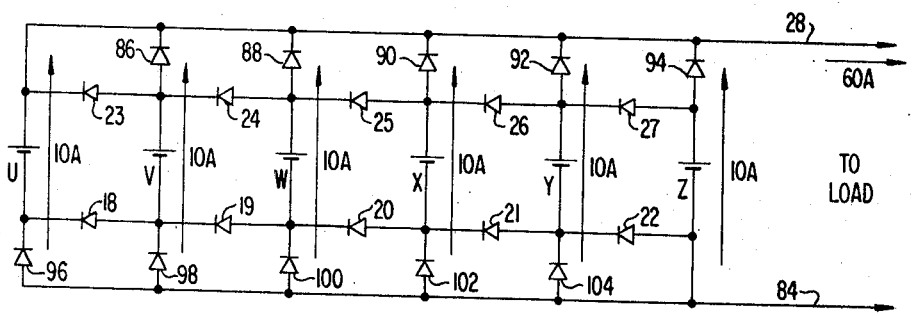

United States Patent Office 3,387,194
Patented June 4, 1968

3,387,194
ELECTRIC MOTOR CONTROL SYSTEM INCLUDING A BANK OF BATTERIES FOR SERIES/PARALLEL OPERATION
Donald S. Banks, 234 Lowell Road,
Wellesley Hills, Mass. 02181
Continuation-in-part of application Ser. No. 431,883, Feb. 11, 1965. This application Oct. 31, 1967, Ser. No. 686,361
10 Claims. (Cl. 318—139)

ABSTRACT OF THE DISCLOSURE

A control circuit for varying the speed of a DC motor energized from a bank of storage batteries by connecting the batteries in various combinations of series and parallel circuits. The batteries are connected in parallel between two buses with all the positive battery terminals connected to one bus and all of the negative battery terminals connected to the other bus. A plurality of diodes are connected in series in each of the buses with one diode connected between each adjacent pair of battery terminals. A cam operated switch is connected between one terminal of each battery and the opposite polarity terminal of the adjacent battery. The switches are closed in a sequence of combinations which permit the voltage applied to the motor to increase in steps equal to the terminal voltage of each battery. The diodes function in such a way that an individual battery whose terminal voltage drops below the bus voltage is effectively disconnected from the motor until the bus voltage falls to the voltage of the disconnected battery. Such an arrangement of diodes also permits the control circuit to be used as a charging circuit in which the individual batteries are charged in parallel.

---

Figure 1:
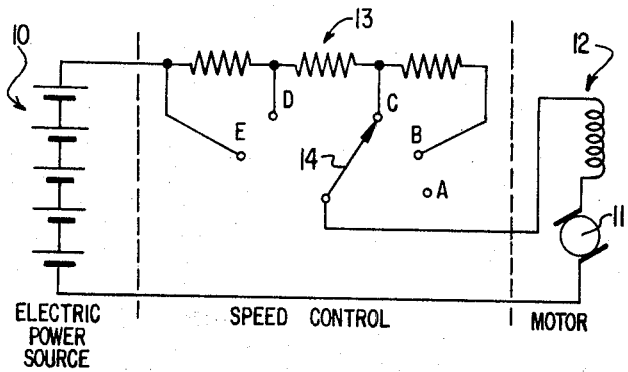

This application is a continuation-in-part of now abandoned Ser. No. 431,883 filed Feb. 11, 1965.

This invention relates to voltage control apparatus and more particulaly to apparatus for controlling the voltage applied from a source to a load such as a motor to control its speed.

In a preferred embodiment of the invention the power source is an electric storage battery composed of multiple cell units for which the invention provides switching means to control various series and parallel connections of the battery units in driving.

One common means of varying the power applied to a load from an electric storage battery, or the like, is a tapped rheostat interposed between the battery and the motor, having a switch arm movable progressively from an open circuit position through the series of taps, to gradually cut out resistance in the line connecting the battery to the motor. Such a switching means is generally characterized by relatively poor efficiency and poor motor speed regulation.

It is a primary object of this invention to provide an improved motor control system characterized by higher efficiency and better regulation.

Another object is to provide a system of the type described having an inherent capability for adapting to changes in the condition of individual cells or cell units of a battery.

The objects of the invention are accomplished by an arrangement of switches and diodes, whereby the cells, or cell units, can be switched from a completely parallel arrangement, through various series-parallel arrangements, to a completely series arrangement, without interruption of current to the load.

An advantage of the arrangement is that local circuits which might bleed a good cell or cell unit through a defective cell or cell unit are, in all cases, blocked by diodes.

A further advantage is that, with the cells, or cell units connected in parallel for driving, deterioration of certain cells or cell units, inherently redistributes the load current so that it is supplied in greater proportion by the cells in better condition and without power loss in deteriorated cells, or cell units, whereby overall efficiency is improved and the effective life of the batteries is extended.

The usual battery charging hookup provides for connection of the terminals of a DC source to the end terminals of a series connected battery. This results in the same current flowing through all of the batteries, regardless of their relative states of charge or condition, leading to overcharge of some cells in order to complete the charging of the weakest cell. Overcharging is generally considered bad practice. It is known that this problem can be reduced by connection of the batteries in parallel to the DC source, but this is generally inconvenient or impossible, because of the fixed connections of the batteries.

Accordingly, another object of my invention is to simplify the connection of the batteries in parallel for charging. More particularly, it is to provide an arrangement of connections between batteries including rectifying means which inherently provide a parallel connection of the batteries in charging, consistently with the switching capabilities of the circuit for supplying different voltages to load. In other words, it is to provide a circuit in which rectifiers are connected between the batteries in such a way as to be effective for control in driving a load, as well as for establishing parallel connection in charging.

Still another object is to provide a circuit of the kind described wherein the rectifiers act to rectify AC current supplied from an AC charging source, while retaining the above-mentioned advantages of the parallel connection of the batteries in charging.

It is a particular object of the invention, associated with the immediately preceding one, to provide full wave charging from an AC source with a balanced loading of the source on both half cycles.

The above-stated objects and advantages, and others, will become apparent from a more detailed description of the invention with respect to the accompanying drawings.

Figure 2:
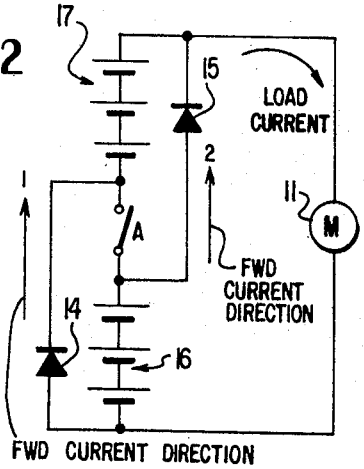
Figure 3:
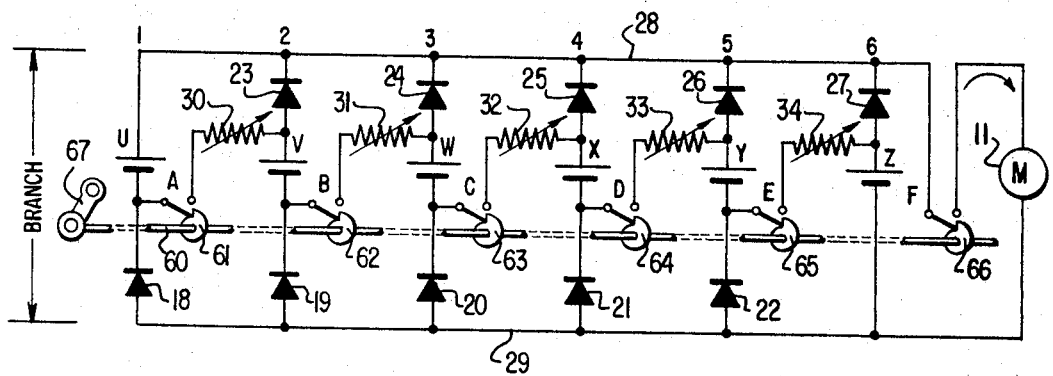
Figure 4:
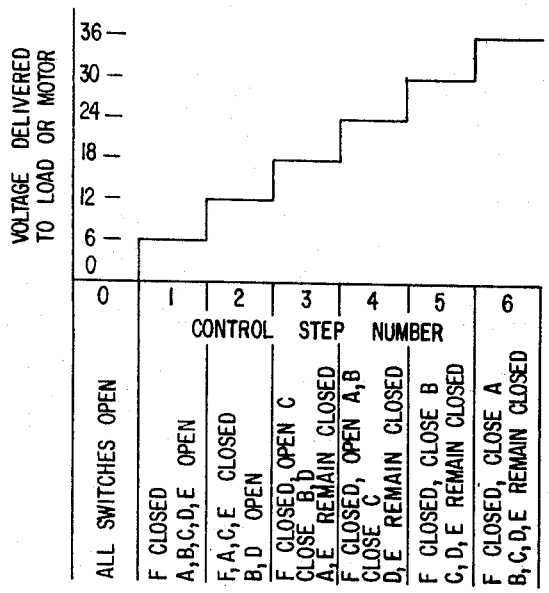

In the drawings:
FIGURE 1 is a circuit diagram of a conventional motor control system;
FIGURE 2 is a simplified circuit diagram illustrating the principle of the invention;
FIGURE 3 is a wiring diagram of a practical circuit embodying the invention;
FIGURE 4 is a diagram showing the control steps provided by the system illustrated in FIGURE 3; and
FIGURES 5, 6, 7A, B, and C, and 8A and B are schematic diagrams of modified circuits embodying the invention.

Referring to FIGURE 1, there is shown a typical prior art system for varying the voltage applied to a motor for the purposes of speed control. The power source is in this case a battery 10 composed of six cell units connected in series, each of which units may consist of a plurality of individual cells connected in series. Series connected between the battery 10 and a motor 11, having a field winding 12, a rheostat 13 provided with four active taps B, C, D and E and one inactive tap A. In the off condition, the wiper arm 14 of the rheostat rests on tap A. To start the motor, the arm is moved progressively through taps B, C, D and E to reduce the resistance in the circuit connecting the motor to its power source by steps. It can be seen that in such an arrangement the efficiency is reduced by the power loss in the rheostat.

FIGURE 2 is a simplified diagram illutsrating some aspects of a system in accordance with the invention, which eliminates some of the disadvantages of the prior art circuit shown in FIGURE 1. The battery in this case is composed of two 18 volt units 16 and 17. Each unit comprises three six volt batteries consisting of three series connected cells. In the description which follows, a six volt battery will generally be referred to as a battery, while a series connected combination of six volt batteries will be called a battery unit. While the minimum individual element which will be referred to hereinafter will be a six volt battery, it will be apparent that the switching principles can be extended to single cell units and the term "battery" is to be understood as extending to single cells.

The battery units 16 and 17 cam be connected in series by a switch A in a circuit connecting them to a motor 11, which is of a type that changes speed in response to changes in voltage of the power supply. A unidirectional current carrying device, shown as a diode 14, is connected in shunt around the group consisting of battery 16 and switch A, while another such device, diode 15 is similarly connected in shunt around the group consisting of battery 17 and switch A. In other words, with the switch A open, the diode 14 is in series with battery 17 while diode 15 is in series with battery 16, both diodes being forward biased to conduct current in the forward current direction indicated by arrows 1 and 2. Note that in this connection the diodes block any local loop comprising the parallel legs containing batteries 16 and 17, thereby preventing the bleeding of current from one unit into the other if the latter should deteriorate.

With switch A closed, the diodes are back-biased and normally ineffective as current carriers. However, if the condition of one battery, such as 16, were to deteriorate to the point where the corresponding diode 14 becomes forward biased by a voltage drop in battery 16, the other battery 17 would then deliver current at full voltage, unimpeded by the resistance and polarization of battery 16.

Note also that the opening of switch A does not interrupt current to the motor, since the diodes provide an immediate path for the current as the switch opens.

Turning now to the practical embodiment of the invention shown in FIGURE 3, this will be seen to comprise a set of D.C. power sources, shown as six 6 volt batteries U, V, W, X, Y and Z. The upper, positive pole of each of the batteries is connected by positive-side connecting means to a positive line 28 containing a switch F through which current can be fed to the upper terminal of a motor 11. Each of the positive-side connecting means, except the one pertaining to the first battery, U, of the series contains a unidirectional current carrying device, these being shown as diodes 23, 24, 25, 26 and 27, respectively. The lower negative pole of each of the batteries is connected by negative-side connecting means to a line 29 extending from the lower terminal of motor 11. Each of the negative-side connecting means, except the one pertaining to the last battery, Z, of the series contains a unidirectional current carrying device, these being shown as diodes 18, 19, 20, 21 and 22, respectively. All of the diodes are poled for conduction in the normal direction of current from the batteries through the motor. Switching means in the form of a series of switches A, B, C, D and E provide for connection of the positive pole of each battery, to the negative pole of the neighboring battery on the left, except for the first battery, U, which is at the left end of the series. These switches can be selectively operated in various combinations, as indicated in the lower part of FIGURE 4, by a switch control mechanism schematically portrayed in FIGURE 3, comprising a shaft 60 having fixed to it a series of cams 61, 62, 63, 64, 65 and 66, respectively operable upon switches A, B, C, D, E and F. The shaft can be turned by a handle 67 through a series of six angular steps.

The operation of the circuit will now be described with reference to FIGURE 4, showing the effect of various switch conditions. In step 0 all switches are open and the circuit in inactive. In step 1 switch F is closed and all of the others open; the batteries are connected in parallel and supply power at 6 volts to the motor, as indicated by the lowest step of the step diagram of FIGURE 4. In step 2 switch F and switches A, C, and E are closed, but switches B and D are open; the batteries are connected in a series parallel arrangement supplying 12 volts to the motor. That is to say, the batteries U and V, W and X, and Y and Z are connected to each other in series, as pairs, while the pairs are connected in parallel to each other. The various other switching arrangements are shown in steps 3 through 6 of the diagram, the last step being a complete series connection of all of the batteries, supplying current at 36 volts to the motor.

It can be seen that the circuit shown in FIGURE 3 provides a battery switching arrangement affording a smooth progression from lower to higher voltage, without interruption between steps. Further smoothing of the transitions between steps can be achieved by means of the variable resistance devices in the individual circuits connecting the batteries in series shown at 30, 31, 32, 33 and 34.

It will be observed that the arrangement of diodes inhibits any local loops through two or more batteries, which could otherwise cause a rapid deterioration of good batteries when one or more of the batteries of the set become defective. Also, it can be seen that with the series connections of batteries the upper diode of the right hand battery of any pair and the lower diode of the left hand battery of the pair are both back-biased, so that current normally flows through the two batteries in series. The circuit in accordance with this embodiment of the invention is capable of automatically adapting itself, when in any of the switching arrangements which set up parallel branches, to deterioration of individual batteries. For example, if the battery in one of the branches discharges to a condition wherein its internal resistance and polarization cause its series connected diode to become reverse-biased, due to the then higher output voltage of a neighboring battery, the other branch will then carry the full load, until it too discharges to a condition equal to that of the first branch to drop out. At this point, both branches will pick up a share of the load current and a balanced operation will continue. For example, the switches on step 2 (FIGURE 4), with switches A, C and E closed and B and D open; if the output voltage of the series coupled pair of batteries W and X drops below the line voltage maintained by battery pairs U, V and Y, Z, diode 24 will be become back-biased and the load current will be supplied by battery pairs U, V and Y, Z, exclusively. When deterioration of the condition of the latter pairs of batteries reduces their output voltage to that of battery pair W, X, diode 24 will become forward biased and battery pair W, X will then constritute its share of the load current. Thus, the arrangement has inherent capabilities of adapting to conditions and keeping in operation over relatively long periods of use, by distributing the load current among the batteries in accordance with their relative abilities to carry the load.

Figure 5:
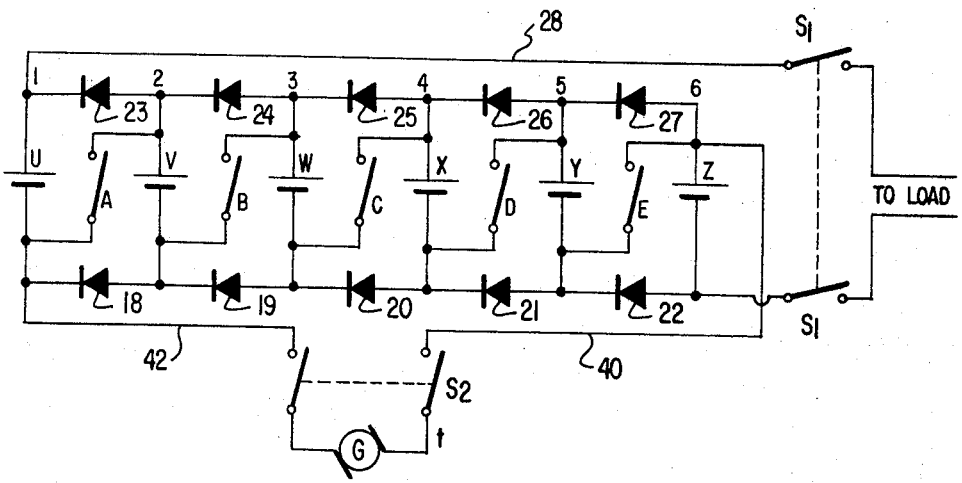

FIGURE 5 shows a modification of the circuit illustrated in FIGURE 3, which offers advantages when charging the batteries. Again, there are six batteries U, V, W, X, Y and Z arranged in branches 1, 2, 3, 4, 5 and 6, respectively. Also, there are five switches A, B, C, D and E, five diodes 18, 19, 20, 21 and 22 at the negative side of the batteries, and five diodes 23, 24, 25, 26 and 27 at the positive side of the batteries. The diodes are, however, arranged differently in FIGURE 5, being connected in series chains, rather than in parallel arrangement, as shown in FIGURE 3. The positive end of diode 22 and the negative end of diode 23 are connected to the load through a double pole switch $S_1$.

The action of this circuit is somewhat different from that shown in FIGURE 3, but the flexibility of switching is similar and its adaptability is even greater. When none of the switches A–E are closed, the circuit supplied current at 6 volts, all branches being connected in parallel. If one of the switches, such as D is closed, this has the effect of increasing the output voltage to 12 volts, the diodes 21 and 26 being back-biased and the parallel pair of batteries Y and Z being thereby connected in series with the parallel group of four batteries U, V, W and X. The number of diodes and batteries in any of the circuit paths established by this connection is the same. For example, in the circuit through battery Z, diode 27, switch D, battery X, diodes 25, 24 and 23, there are a total of four diodes and two batteries. Similarly, in the circuit through diode 22, battery Y, switch D, diode 20, battery W, and diodes 24 and 23, there are likewise four diodes and two batteries.

If any additional switch is closed, such as switch B, the voltage of the output is increased to 18 volts and the circuit is again a series-parallel one. Any one of the circuit paths will include three diodes and three batteries. For example, the path through diode 22, battery Y, switch D, battery X, diode 25, switch B (diode 24 being back-biased) battery V and diode 23, includes three diodes and three batteries.

By closing additional switches of the group A–E the voltage can be increased in 6-volt steps to a maximum of 36 volts. In no case does the full load current pass through only a single diode, thus relaxing the diode current rating. For example, with all switches A–E closed, the current passes through none of the diodes. With switches A–D closed and switch E open the current divides equally between diodes 22 and 27, batteries Y and Z being in parallel, with this connection.

Here again it will be observed that the arrangement of diodes inhibits any local loops through two or more batteries, which could otherwise cause a rapid deterioration of good batteries when one or more of the batteries of the set become defective. Also, it can be seen that with the series connections of the batteries the upper diode of the right hand battery of any pair and the lower diode of the left hand battery of the pair are both back-biased, so that current normally flows through the two batteries in series, as long as both batteries are in good condition. However, if the condition of either battery deteriorates to the point where its internal resistance and polarization condition cause a voltage drop through it, the diode or diodes connected in parallel with it become forward biased and the current through the other battery will be fed through these diodes and not through the poor battery. For example, if batteries X, Y and Z are connected in series, switches D and E being closed and switch C being open, and if battery Z becomes dead, current will pass through now forwardly biased diode 22, battery Y, not through back-biased diode 26, but through switch D, thence through the four parallel paths including batteries X, W, V and U and the related diodes 20, 19, 18 and 25, 24, 23, to line 28, supplying current at 12 volts.

The above example demonstrates the ability of a series-connected group of batteries, arranged in accordance with this embodiment of the invention, to retrieve the situation and maintain operation, though at a reduced voltage level, if one of the batteries of the series goes dead. This contrasts with the situation in a series battery circuit of the prior art, in which if one battery of the series becomes dead there is over-discharging of the dead battery and reduction of the available power.

FIGURE 5 also shows the charging circuit, comprising a direct current generator G connected by a single throw double pole switch $S_2$, a line 40 connected to the positive pole of battery Z, and a line 42 connected to the negative pole of battery U. In charging, the switch $S_1$ is open and switch $S_2$ closed. Switches A–E are all open. The current then passes from the positive side of generator G through lead 40, through all of the batteries in parallel, and through lead 42 back to the negative side of the generator. A typical path goes from lead 40 through diodes 27 and 26, battery X, diodes 20, 19 and 18, to lead 42. It will be found that every path of the charging current includes five diodes.

This circuit provides parallel charging of all of the batteries, with the advantages noted earlier, without requiring any additional diodes or switches in the interconnections between the batteries. If one battery reaches a higher charge than another at any given time the resulting back EMF diverts the current in greater proportion through the other batteries. Thus all of the batteries arrive at a full charge concurrently. Furthermore, this is accomplished by the same diodes which have control functions in driving the load.

Figure 6:
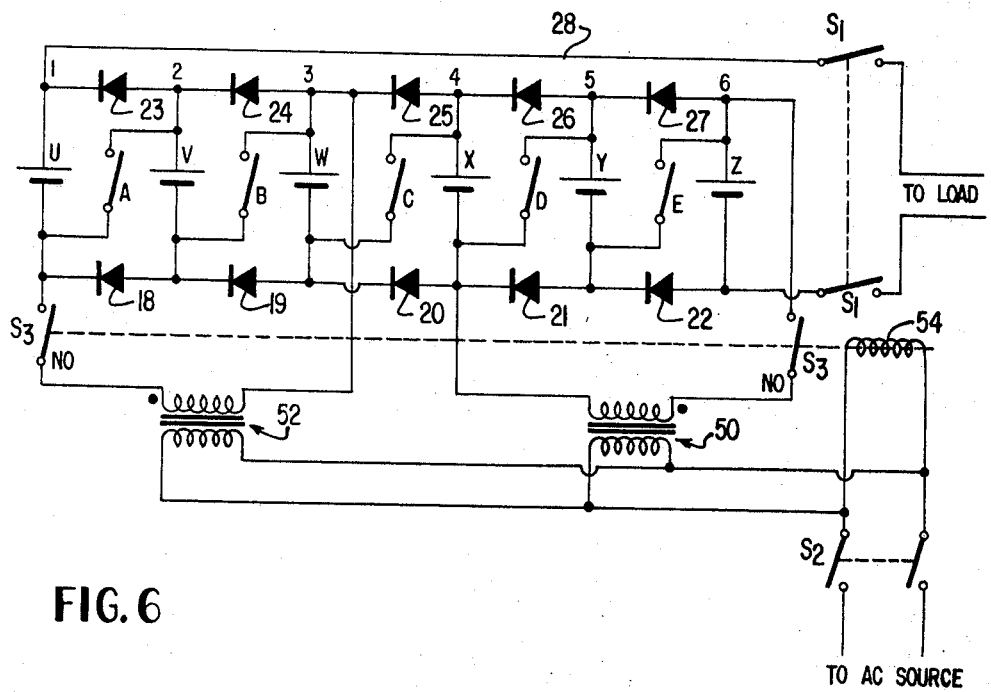

FIGURE 6 shows another circuit in accordance with the invention, illustrating the capability of the circuit network to be charged from an AC source, without any additional diodes. The battery network proper is identical to FIGURE 5 and is connected to the load by a switch $S_1$, but the charging circuit includes two transformers 50 and 52 having primary windings connected through a switch $S_2$ to an AC source. While these primary windings are shown connected in parallel, they can equally well be connected in series. A solenoid 54 operates a switch $S_3$ to connect the secondary windings of the transformers to the battery network. The secondary windings are reversely poled, as indicated by the dot symbols. The right end of the secondary of transformer 50 is connected to the positive poles of batteries X, Y and Z, by circuitry including diodes 26 and 27, while the left end of this secondary is connected to the negative poles of these batteries by circuitry including diodes 21 and 22. Similarly, the right end of the secondary of transformer 52 is connected to the positive poles of batteries U, V, and W, through circuitry including diodes 23 and 24, and the left end of this secondary is connected to the negative poles of these three batteries through circuitry including diodes 18 and 19. It will be seen that on one half cycle of the AC source the batteries X, Y and Z are charged in parallel, while on the other half cycle the batteries U, V and W are charged in parallel. As in the case of the circuit shown in FIGURE 5, the current is uniformly distributed to the batteries, due to the back EMF effect of any battery which becomes more charged than the others. This avoids any unbalance of charging.

Instead of connecting the left end of the secondary winding of transformer 50 to a point between diodes 20 and 21 and the right end of the secondary of transformer 52 to a point between diodes 24 and 25, the left end of the secondary of transformer 50 could be connected to any point further to the left in the lower series of diodes and the right end of the secondary of transformer 52 could be connected to any point between the diodes further to the right in the upper series of diodes. This would merely result in full-wave charging of an intermediate group of the batteries, which is without adverse effect, because of the balancing influence on the distribution of the charging current through parallel sets of batteries. It is preferable to make the connections symmetrical in any case.

FIGURES 7A, B and C illustrate preferred embodiments of the invention, wherein the control circuit may be connected directly to an AC source in order to charge the batteries without the need for any additional rectifiers. In FIGURE 7A, the same references numerals as used in FIGURE 6 indicate corresponding elements in the two figures. The secondary windings 56, 58, 60, 62, 64 and 66 of a transformer are connected in series with batteries U, V, W, X, Y, Z, respectively.

As shown in FIGURE 7B, the secondaries may be part of a single phase transformer having a single primary winding 68 which is connected through a switch $S_5$ to a 60 cycle, 110 volt AC source 70. Windings 56, 60, and 64 are wound in one direction, and windings 58, 62 and 66 are wound in the opposite direction. As shown in FIGURE 7C, the windings may be the secondary windings of a three phase transformer having star-connected primary winding 72 and a neutral conductor N with the phases being connected through a switch S6 to a suitable three phase AC supply. The three phase primary may also be connected in a delta or other configuration. In this case, the scondary windings are all wound in the same direction.

Furthermore, a plurality of diodes 74, 76, 78, 80, 82 and 84 are connected across the switches A, B, C, D, and E, respectively. These diodes are optional and their function is to permit charging of the batteries regardless of whether the switches are open or closed.

The circuit of FIGURE 7A operates in the same manner as the circuits of FIGURES 5 and 6 when the batteries are delivering power to the load. However, on the charging cycle, switch S1 is opened and either switch S4 or S5 is closed depending upon whether a single phase or a three phase transformer is used.

When the secondary windings are part of a single phase transformer as illustrated in FIGURE 7B, adjacent ones of the secondary windings 56, 58, 60, 62, 64 and 66 are wound in the opposite direction. Therefore, adjacent batteries are charged on opposite half cycles of the single phase supply. In other words, the lower ends of windings 56, 60 and 64 would be positive, when the lower ends of windings 58, 62 and 66 are negative. Consequently, on one half cycle of the AC supply, battery U would be charged through either diode 74 or closed switch A in series with diode 23, battery W through diode 78 or closed switch C in series with diode 25 and through diode 19 and diode 76 or closed switch B. Battery Y would be similarly charged. On the next half cycle, battery V would be charged by secondary winding 58 through diode 18 connected in series with either diode 74 or the closed switch A and through either diode 76 or closed switch B in series with diode 24. In similar manner, battery X will be charged by secondary winding 62 through diode 80 or closed switch D in series with diode 26 and through diode 20 in series with either diode 78 or closed switch C. Battery E would be similarly charged.

When the secondaries are part of the three phase transformer illustrated in FIGURE 7C, they are all wound in the same direction, as indicated by the dots on the windings. Windings 56 and 58 are coupled to one phase of the transformer, windings 60 and 62 to another phase, and windings 64 and 66 to the third phase.

In the circuit of FIGURE 7A, each battery again draws current in proportion to its state of discharge, thereby minimizing the possibility of overcharging of some batteries in order to adequately charge others as is the case in series charging.

With the diodes 74, 76, 78, 80 and 82 connected in the control circuit, switches A, B, C, D and E may be left open during the charging cycle. Furthermore, an important advantage of connecting the individual secondary windings in series with each of the batteries is that the switch S3 illustrated in FIGURE 6 is eliminated.

With the arrangement shown in FIGURE 7A, the transformer secondary windings may actually be connected in series with the batteries by removable jumpers to permit charging by DC current from an external battery charger. In this case, the jumpers connecting the windings in series with the batteries are removed and the circuit of each battery branch is completed by connecting a jumper, i.e. short circuit, across the terminals where the secondary winding had been connected. The charger would be connected across terminals 81 and 83.

FIGURES 8A illustrates a simplified schematic diagram of the control circuits illustrated in FIGURES 5, 6 and 7A, when all the switches A, B, C, D and E are open. The circuit has been labeled with the values of the various branch and diode currents for an assumed load current of 60 amps. It can be seen that even though corresponding pairs of the upper series-connected diodes 23, 24, 25, 26 and 27 and the lower series-connected diodes 18, 19, 20, 21 and 22 share the total current of 60 amps, the current carried by the individual diodes varies widely except for the center pair, with individual diodes of the two end pairs carrying currents differing by a ratio of 5:1.

FIGURE 8B illustrates a variation in which the diode currents may be equalized by connecting another upper diode between the positive terminal of each of the batteries, except the first battery U, and the load connecting line 28 and also connecting another lower diode between the negative terminal of each of the batteries except the last battery Z, and the other load connecting line 84. The upper diodes are labeled 86, 88, 90, 92 and 94; the lower diodes are labeled 96, 98, 100, 102 and 104. The resulting diode currents for the case of all the switches A, B, C, D and E being closed are labeled on FIGURE 8B. The diode currents have now been equalized so that each of the new diodes carries only 10 amps for the full load condition of 60 amps. The equalization also is maintained for other combinations of the settings of the switches A, B, C, D and E. The advantage of such equalization of diode currents is a reduction in the required current rating of the individual diodes.

The circuit of FIGURE 8B provides for the same charging characteristics as shown in FIGURES 5, 6 or 7A, since the upper series-connected diodes 23, 24, 25, 26 and 27 and the lower series-connected diodes 18, 19, 20, 21 and 22 function in the same manner as previously described. Of course, with the embodiments of FIGURES 7A, B and C, secondary windings must be connected in series with the individual batteries.

The invention has been explained by reference to several illustrative embodiments, but it will be evident that various additional modifications can be made without deparing from the principle of the invention, the scope of which is limited only as defined in the following claims.

What is claimed is:

1. Apparatus for applying from a plurality of voltage sources different DC voltages across a load, said sources constituting a set including a first and last source, each of said sources having a positive and a negative terminal, and comprising:
    (a) positive and negative lines for connection to opposite terminals of the load;
    (b) positive-side connecting means connecting all of the positive terminals of said sources to said positive line and including first unidirectional current carrying means interposed between the positive terminals of each pair of adjacent voltage sources, said unidirectional current carrying means being poled to offer low resistance to current flowing from the positive terminals of said sources to said positive line;
    (c) said first unidirectional means comprising a series-connected set of diodes, one for each of said voltage sources except said first one, each diode having its positive end connected to the positive terminal of its respective voltage source;
    (d) negative-side connecting means connecting all of the negative terminals of said sources to said negative line and including second unidirectional current carrying means interposed between the negative terminals of each pair of adjacent voltage sources, said second unidirectional current carrying means being poled to offer low resistance to current flowing from said negative line to the negative terminals of said sources;
    (e) said second unidirectional means included in said negative side connecting means further comprising a series-connected set of diodes, one for each of said voltage sources except said last one, each diode having its negative end connected to the negative terminal of its respective voltage source;

(f) a plurality of switching means adapted to connect the positive terminal of each of said sources, except said first source, to the negative terminal of the adjacent source of the set in the direction of said first source; and (g) means for selectively closing said switching means in various combinations, to establish a series of different connections of said sources to said lines ranging from a completely parallel arrangement affording the lowest voltage supply between said lines, through various series parallel connections providing progressively higher voltages, to a completely series connection establishing the highest voltage supply between said lines.

2. Apparatus as described in claim 1, in combination with a charging source having two terminals, and means for connecting said terminals to the positive pole of said last voltage source and the negative pole of said first voltage source.

3. Apparatus as described in claim 1, in combination with an AC current source; transformer means comprising primary winding means connected to said AC current source and two secondary windings; means for connecting a first end of a first one of said secondary windings to the positive terminal of said last voltage source; means for connecting the similarly phased end of the other one of said secondary windings to the negative terminal of said first voltage source; means for connecting the opposite end of said first secondary winding to the negative terminal of an intermediate one of said set of voltage sources; and means for connecting the opposite end of said other secondary winding to the positive terminal of another intermediate one of said set of voltage sources; said intermediate voltage sources being selected so that current of at least one phase is supplied to each one of said voltage sources.

4. Apparatus as described in claim 1, wherein said load is a DC motor of a type which responds to variations in input voltage by changing its speed.

5. An apparatus as defined in claim 1 wherein:
(a) said voltage sources are storage batteries, and further comprising:
(b) a transformer having a primary winding and a plurality of secondary windings,
(c) means connecting a different one of said secondary windings in series with each of said batteries, and
(d) means for connecting said primary winding to an AC source so that when all said switching means are closed and when said AC source is connected to said primary winding, DC charging current flows from one side of each secondary winding through a closed switching means, one of said unidirectional current carrying means, and said positive side connecting means, and then into the positive terminal and out of the negative terminal of the battery back to the other side of the secondary winding.

6. An apparatus as described in claim 5 wherein said positive side connecting means further comprises:
(a) unidirectional current carrying means connected between the positive terminal of each voltage source, except the first, and said positive line to conduct current from said positive terminal to said positive line, and
(b) another unidirectional current carrying means connected between the negative terminal of each voltage source, except the last, and said negative line to conduct current from said negative line to said negative terminal.

7. Apparatus as defined in claim 5 further comprising a diode connected across each of said switching means and poled in the direction of said charging current so that said charging current will flow through the diode when said switching means is open.

8. An apparatus as defined in claim 5 wherein:
(a) said transformer is a three phase transformer,
(b) said secondary windings are all wound in the same direction,
(c) the number of batteries is a multiple of three, thereby forming three sets of batteries, and
(d) the secondary windings connected to the batteries in each set are coupled to a different phase of said transformer.

9. An apparatus as defined in claim 5 wherein:
(a) said transformer is a single phase transformer, and
(b) adjacent ones of said secondary windings are wound in opposite directions.

10. An apparatus as described in claim 1 wherein said positive side connecting means further comprises:
(a) unidirectional current carrying means connected between the positive terminal of each voltage source, except the first, and said positive line to conduct current from said positive terminal to said positive line, and
(b) another unidirectional current carrying means connected between the negative terminal of each voltage source, except the last, and said negative line to conduct current from said negative line to said negative terminal.

References Cited

UNITED STATES PATENTS

| 3,207,966 | 9/1965 | Parkinson | 320—5 XR |
| 3,256,474 | 6/1966 | Englund | 320—7 |
| 3,264,540 | 8/1966 | Dannettell | 318—139 |
| 3,286,152 | 11/1966 | Noe | 320—7 |

BENJAMIN DOBECK, *Primary Examiner.*

G. SIMMONS, *Assistant Examiner.*